United States Patent [19]

Glossop, Jr. et al.

[11] Patent Number: 5,159,781
[45] Date of Patent: Nov. 3, 1992

[54] WINDOW PANEL POSITION REGULATING ASSEMBLY

[75] Inventors: Donald L. Glossop, Jr., Dearborn Heights; Giuseppe Delena, Northville; William J. Fobar, Wyandotte, all of Mich.

[73] Assignee: Ford Motor Company, Dearborn, Mich.

[21] Appl. No.: 592,736

[22] Filed: Oct. 4, 1990

[51] Int. Cl.⁵ ............................................. E05F 11/38
[52] U.S. Cl. ........................................ 49/375; 49/441
[58] Field of Search ............... 49/374, 375, 348, 377, 49/440, 441, 213

[56] References Cited

U.S. PATENT DOCUMENTS

| | | |
|---|---|---|
| 370,502 | 9/1887 | Susemihl . |
| 1,346,268 | 7/1920 | Smith . |
| 2,844,405 | 7/1958 | Roethel ............................ 296/44.5 |
| 2,979,327 | 4/1961 | Swanson et al. .................... 268/124 |
| 3,514,902 | 6/1970 | Anderson ............................ 49/213 |
| 4,089,134 | 5/1978 | Koike .................................. 49/227 |
| 4,241,542 | 12/1980 | Podolan .............................. 49/352 |
| 4,420,906 | 12/1983 | Pickles ............................... 49/352 |
| 4,561,211 | 12/1985 | Raley et al. ......................... 49/374 |
| 4,575,967 | 3/1986 | Bickerstaff .......................... 49/211 |
| 4,730,414 | 3/1988 | Nakamura et al. .............. 49/374 X |
| 4,771,575 | 9/1988 | Tiesler ................................ 49/211 |
| 4,783,930 | 11/1988 | Tiesler ................................ 49/374 |
| 4,785,582 | 11/1988 | Tokue et al. .................... 49/374 X |
| 4,788,794 | 12/1988 | Miller ................................. 49/214 |
| 4,905,412 | 3/1990 | Spock et al. .................... 49/375 X |
| 4,932,161 | 6/1990 | Keys et al. ...................... 49/374 X |
| 4,984,389 | 1/1991 | Benoit et al. .................... 49/377 X |

FOREIGN PATENT DOCUMENTS 40588  11/1981  European Pat. Off. ............. 49/374

Primary Examiner—Rodney M. Lindsey
Assistant Examiner—Jerry Redman
Attorney, Agent, or Firm—Roger L. May; Daniel M. Stock

[57] ABSTRACT

A vehicle window regulating and sealing assembly for raising and lowering a window. The window is supported at the sides within vertical guide channels by pivotal sliding upper and lower guide members attached to the window. The guide channels include an outwardly extending curved ramp section within which the lower guide members track to cause the window to pivot about the upper guide members as it nears the raised position thereby causing the window to firmly bear against relatively non-yielding sealing members to establish a perfectly flush positioning of the window relative to the vehicle exterior. The guide channel members each include a housing having an elongate U-shaped elastomeric seal disposed with its open end facing the window and receiving in sealing engagement a vane type seal member affixed to the window whereby a seal is maintained between each guide channel and the window between the upper and lower guide members when the window is fully raised and at all times during the raising and lowering of the window when the upper guide member is above the beltline.

10 Claims, 7 Drawing Sheets

WINDOW PANEL POSITION REGULATING ASSEMBLY

TECHNICAL FIELD

The present invention relates to a window panel position regulating and sealing assembly, and more particularly a regulating system for raising and lowering a vehicle window and assuring that the window is perfectly flush and fully sealed with the vehicle exterior on all sides including the lower edge.

BACKGROUND OF THE INVENTION

In recent years, vehicle window glass has undergone significant evolution and increasingly dramatic styling have brought about the use of cylindrically curved door window panes as a contribution to overall vehicle design. Coupled with this, a redesign effort is being made to provide a flush finish between the window panels and the exterior of the vehicle to further enhance appearance and aerodynamics and to reduce wind noise. For example, as regards the side door windows, it is desired that the window panel be flush with the exterior door panel at the beltline, as well as at the roof panel and pillars, rather than being inset transversely within the framework of the door as in previous years.

Being flush at these surfaces requires a unique construction of the window position regulating mechanism. It also requires a unique system for sealing the edges of the window panel around the entire framework.

It is known, for example, to achieve a flush edge condition in a sedan type vehicle having a door frame that has vertical portions to provide front and rear (generally vertically arranged and curved) guide channels secured to the interior door panel, and to provide within each guide channel a plastic guide affixed to the window and in rolling or sliding engagement with the guide channel. For one previous concept, the plastic guide is curved similarly to the window and increases in transverse cross-sectional width from the top of the window to the bottom of the window such that as the window is raised, the lower edge portion of the window will move progressively outward toward the outer door panel and will be nearly flush with the outer door at the beltline at its fully raised position. Such an arrangement is shown in U.S. Pat. No. 4,561,211.

Other systems are known such as shown in U.S. Pat. Nos. 2,979,327; 4,575,967; and 4,783,930 for accomplishing a substantially flush condition of the vehicle side door window wherein a slightly cylindrically curved window or flat or nearly flat window is guided by a pair of guide channels fixed within the door panel at the front and rear edges thereof with each guide channel including (at a position just above or just below the beltline) a track or guide channel portion inclined relatively abruptly and outwardly such that when the window reaches its raised position or nearly raised position, the lower edge of the window will be translated laterally outwardly into a substantially flush position at the beltline and at the upper edge of the window with the vehicle exterior. In each case, the window pivots basically about its upper edge as the lower edge of the window swings laterally outward. Such a system may work relatively well with a constant curvature or with flat or nearly flat glass, since the compression seal used for weatherstripping the window frame can accommodate a small degree of compression or lateral transfer. With the more cylindrically curved windows of the present day vehicles, such systems would prove unsatisfactory.

Yet another substantially flush vehicle door assembly is shown in U.S. Pat. No. 4,771,575 which like those mentioned immediately above, causes a window to pivot about its upper edge as the lower edge of the window is laterally transferred to and from the exterior door panel. The means by which the lateral transfer is effected, rather than being dependent upon the shape of the guide track, is accomplished by means of the interior seal affixed to the window sash pipe bearing against the inner weatherstrip seal of the inner door panel and being forced in the outward direction as the window is raised; conversely when the window is the interior seal disengages the inner weatherstrip seal and thereby allows the lower edge of the window to swing inward.

Another system for providing a flush vehicle window is shown in U.S. Pat. No. 4,788,794. As with the present invention, the window is caused to pivot at a position intermediate that of the beltline and the upper edge of the window such that as the window is raised, its lower edges laterally traverses outward to a substantially flush position with the beltline, and the upward edge of the window at its inner surface is caused to traverse laterally inwardly to bear against the weatherstrip seal running longitudinally at the roof panel and vertically downwardly at the front and rear edges of the window to the point of the pivot. The pivot point is established by an upper guide pin which rides within a curved track vertically arranged at the front and rear of the door panel. A lower guide pin is affixed to the lower edge of the window and as it approaches the fully raised window position is caused to enter in an abruptly curved portion of the track extending outwardly toward the exterior door panel such that the lower portion of the window is translated laterally outwardly in a manner similar to certain of the above-mentioned patents.

Unlike the present invention, the guide channel is seen to be of fairly expensive construction since the upper guide pin is seen to be riding on a rail and the lower guide pin within a groove, rather than each riding along the same guide surface. It is also subject to disengagement from tolerances and loading of the window. Further, the compression seal provided between the beltline and the pivot point must be deflected more when the window is being moved than when the window is at rest fully closed. Generally, a flexible lip type seal as shown has not proven satisfactory, particularly in cold weather conditions, to accommodate the degree of window movement involved.

None of the aforementioned systems is seen to provide a window position regulating assembly which will (i) establish a perfectly flush interface between the window and the vehicle exterior at all points about the perimeter of the window, or (ii) provide a reliable full seal about the perimeter of the window, or (iii) provide a simply constructed, economical and highly reliable mechanism for accomplishing these results. They also are limited in the amount of irregular shape of window surface which can be accommodated and the consideration for accommodation in an unframed door (i.e., a hardtop window).

SUMMARY OF THE INVENTION

The present invention contemplates a vehicle door and window assembly wherein the window is perfectly flush at all four sides with the exterior surface of the vehicle.

The invention further contemplates a vehicle door and window assembly wherein the guide means for raising and lowering the window to its flush position with the exterior vehicle surface is simply, effectively, and economically constructed, does not require a surrounding door frame to accommodate guides and seals and can accommodate more complex window shapes.

The invention further contemplates a window guide system including front and rear guide channels for respectively supporting the front and rear ends of a vehicle side door window such that the lower extremity of the window has a relatively abrupt outward movement adjacent the end of its upward travel thereby bringing the window flush with the side door outer panel in the closed position. The guide channel construction supports an upper slide fixed to the approximate mid-point of the window and about which the window pivots during the abrupt outward movement of its lower end. The same channel construction also supports a lower guide means affixed to the bottom edge of the window that positions the lower end of the window during its vertical movement and at its abrupt outward movement just prior to reaching the closed position.

Specifically, the channel construction at the rear edge of the door receives a lower guide means constituting a set of three rollers. One pair of rollers is received within the channel while a third roller is guided along the exterior of its open side so as to move outwardly at a ramp while the upper slide continues upwardly past the ramp and to the upper portion of the channel construction; this construction thus provides a single guide channel for both the upper and lower locations of support of the window. At the front edge of the door, the lower guide means constitutes a slide member which need not be supported in the channel until it is funneled into the guide shortly before the slide is to traverse the ramp.

Further, the channel construction provides an integrated chamber for containing a tape or cable drive for controlling the lifting and lowering of the window. The attachment of the tape or cable drive is to the upper of the two guides at each front and rear guide which allows the bottom of the lowered window to be positioned lower in the door.

Further, the present invention contemplates a channel construction, as described above, which supports a female seal member having an elongated slot that receives a male vane type seal member on the window to permit the outward window movement and subsequent inward window movement upon lowering without requiring excessive compressive forces otherwise inherent in the normal compressive seals as mentioned above in connection with the discussion of the prior art.

Further, the present invention contemplates a vehicle window and door system as above described which includes a longitudinally extending sealing system at the beltline that is particularly effective in accommodating a fairly wide range of lateral movement of the lower edge of the window while still providing an effective seal throughout the extent of such lateral movement, which includes a dual seal at the outer door panel, and features deflecting of window and door surfaces to assure a flush condition which is more nearly perfect than would be achievable with tolerance control alone.

The above objects and other objects, features and advantages of the present invention are readily apparent from the following detailed description of the best modes for carrying out the invention when taken in connection with the accompanying drawings.

BEST MODE FOR CARRYING OUT THE INVENTION

Figure 1:
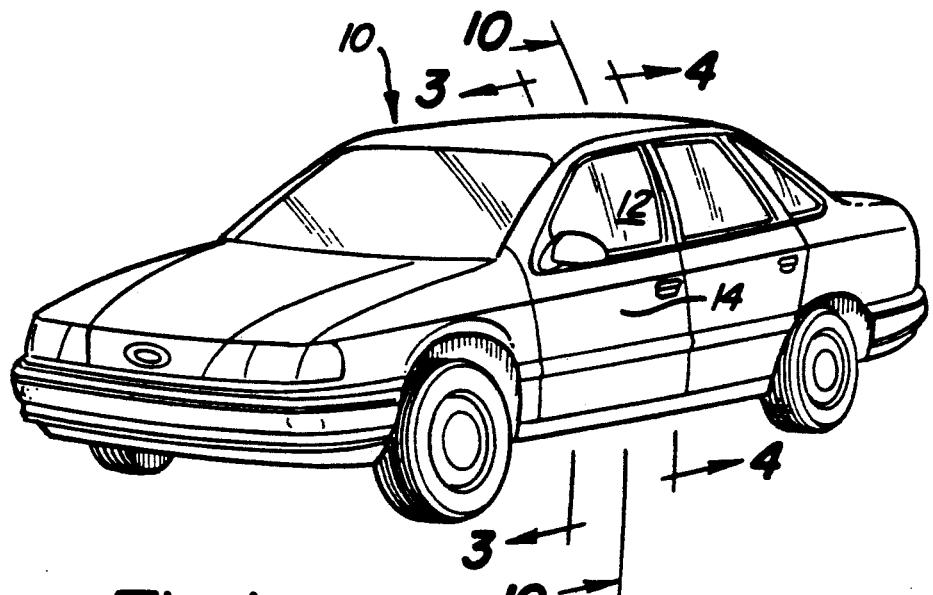
FIG. 1 is a perspective view of a vehicle body illustrating in particular the vehicle side door and window pane for which the present invention is adapted.
Figure 2:
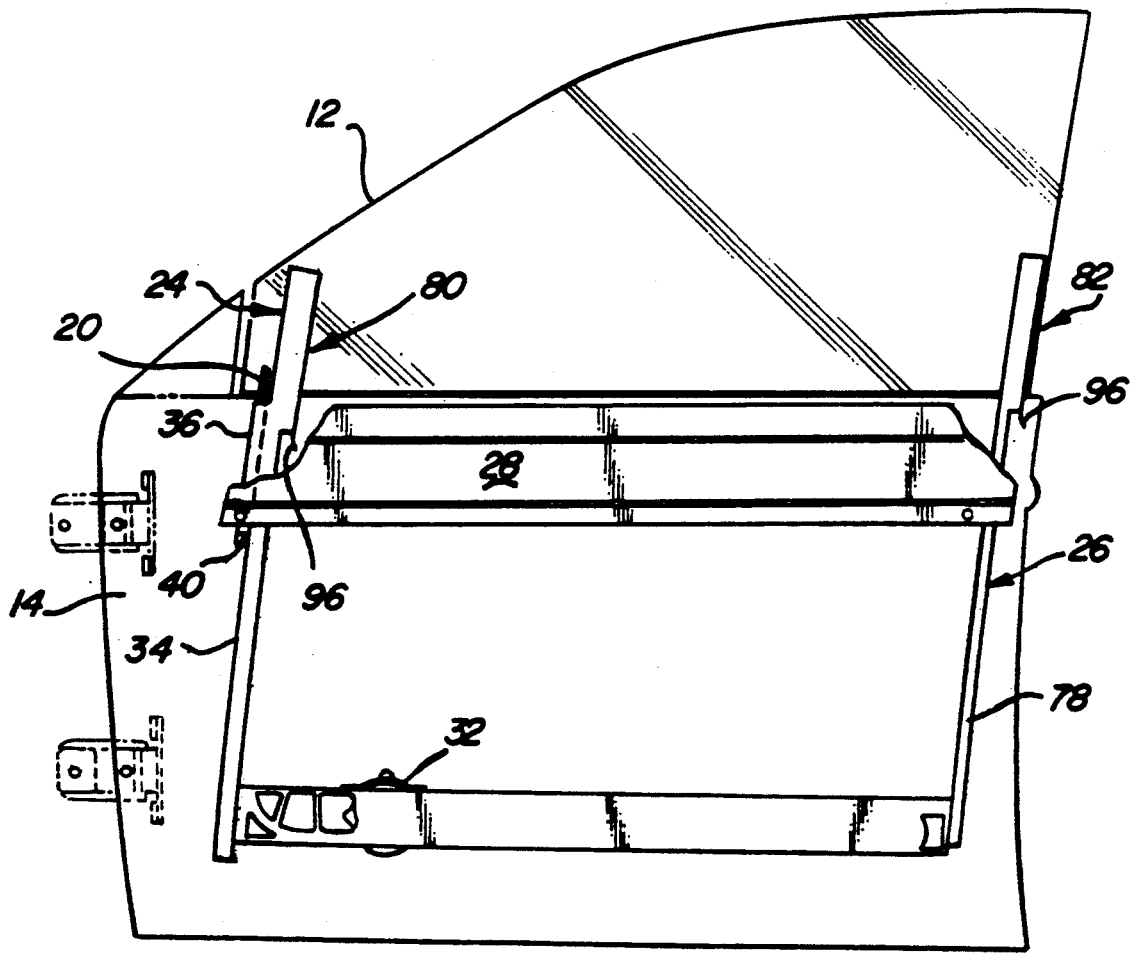
FIG. 2 is a side elevation view of the window pane and door assembly showing the window regulating mechanism within the door cavity and from the interior of the vehicle in accordance with the present invention.

There is shown in FIG. 1 a motor vehicle, designated generally at 10, of basic design illustrating the aerodynamic enhancement of the vehicle that is provided by a cylindrically curved window 12 that is flush to the exterior of the vehicle. Each of the side doors is so equipped. For purposes of describing the present invention, reference will be made only to the left front side door 14 as shown in FIG. 2 with the inner door panel removed for purposes of illustrating the window regulating system.

While the description appearing below is limited to a cylindrically curved window, the present invention is equally applicable to a doubly-curved window.

The term "doubly-curved" refers to a window panel which is not only curved in the direction about the horizontal axis of the vehicle being primarily apparent in the front and rear views of the vehicle, but also curved in the third dimension, i.e. about a somewhat vertical axis of the vehicle being primarily apparent in the plan view of the vehicle.

An example of a doubly-curved window is shown in U.S. patent application Ser. No. 525,573, filed May 21, 1990 and entitled "Window Panel Position Regulating Assembly", and assigned to the same assignee as the present invention. In particular, the co-pending patent application Ser. No. 525,573 discloses a doubly, irregularly-curved window wherein the degree of convexity of the window is not uniform along any axis, the teachings of which are incorporated herein by reference.

Figure 3:
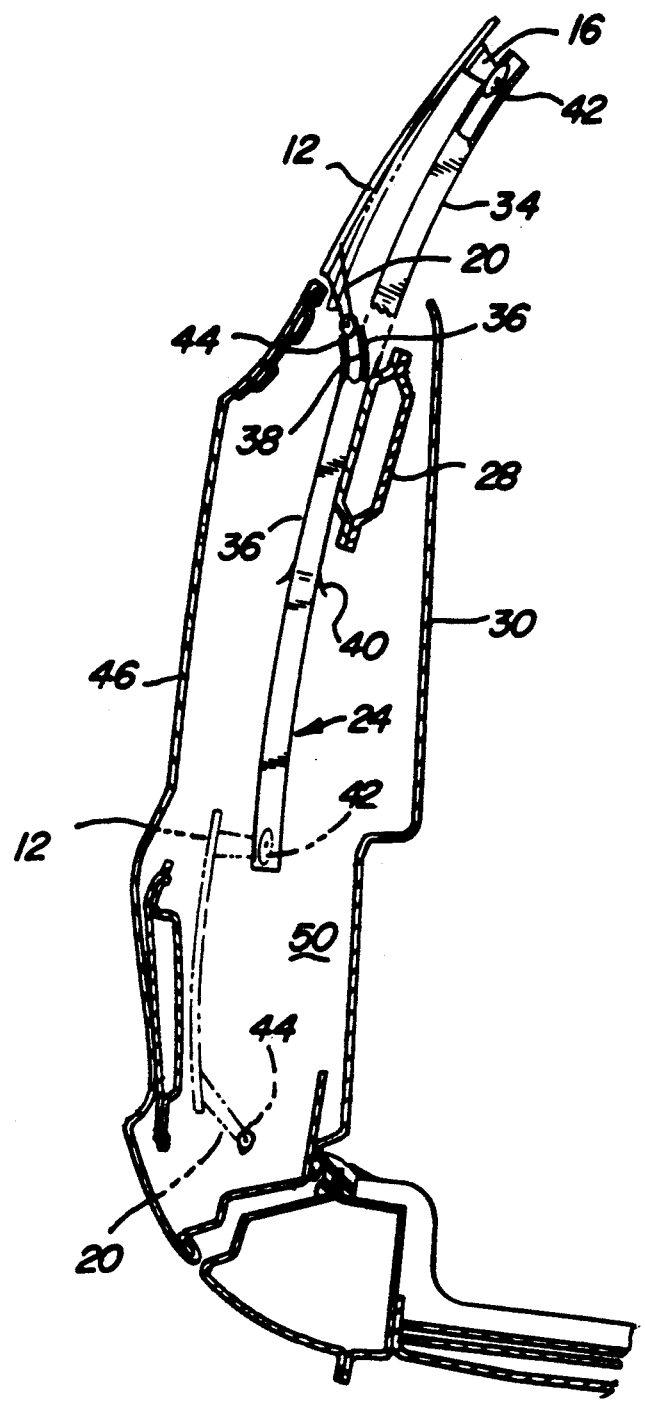
FIG. 3 is a sectional view taken substantially along the lines 3-3 of FIG. 1.
Figure 4:
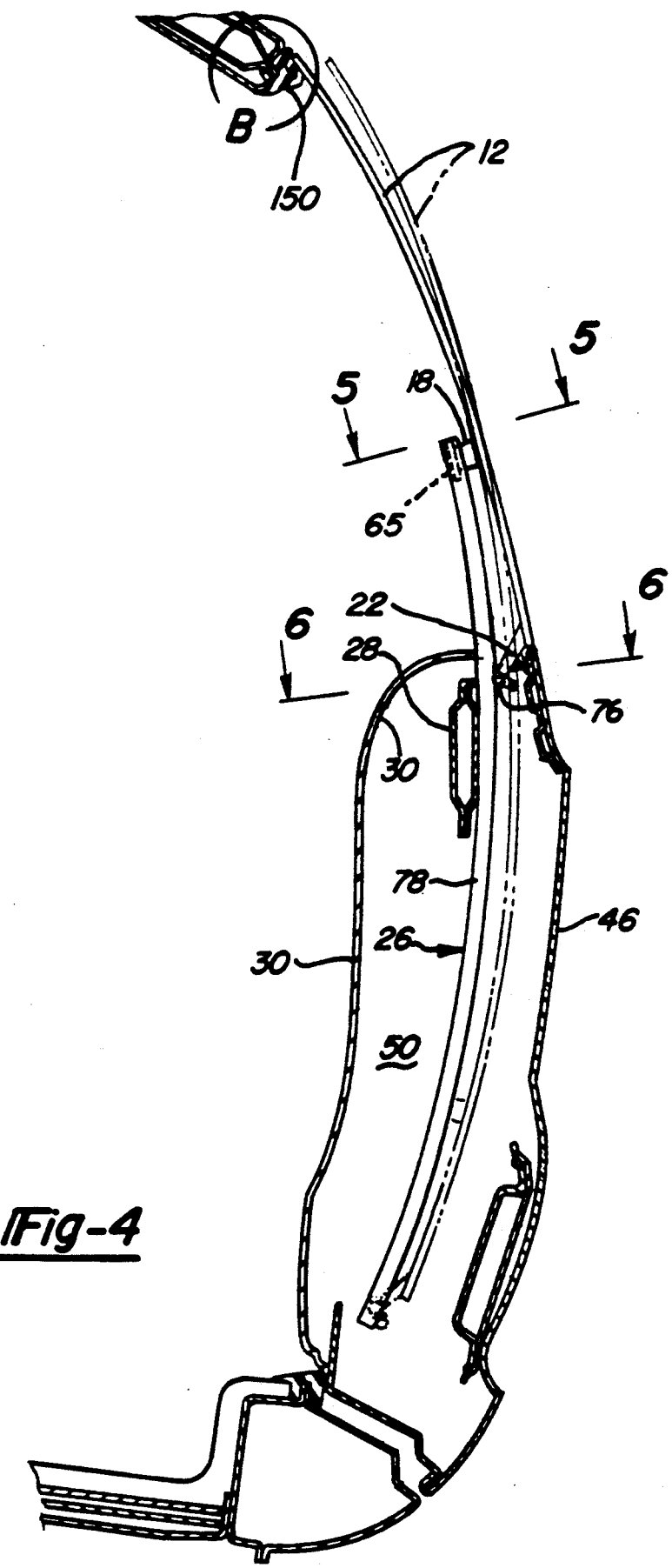
FIG. 4 is a sectional view taken substantially along the lines 4—4 of FIG. 1 and illustrating the rear guide channel assembly in accordance with the present invention.

The overall system is seen best in FIGS. 2–4. The window 12 is mounted to the door, generally designated at 14, by upper guide followers 16, 18 and lower guide followers 20, 22 affixed to the window and respectively operatively coupled with a pair of guide channel members 24, 26 at the front and rear edges, respectively, of the door. Each guide channel member is affixed to a longitudinally extending reinforcement member 28, which in turn is affixed to the inner door panel 30 to thereby secure the relative position of the guide channel members relative to the overall door assembly.

The window 12 may be raised and lowered by means of a tape-type window regulator drive including a driving motor 32 which powers a continuous tape (not shown). The tape is operatively coupled with the upper guide followers 16 and 18 positioned slightly below the midpoint of the window pane (e.g. preferably one-third the height of the window above the beltline), in a manner described briefly below, to raise or lower the window 12 dependent on the direction of the drive motor 32. The window regulator drive forms no part of the present invention and could be of any other construction including a hand crank mechanism. However, for purposes of example, a tape-type window regulator drive system is shown in pending U.S. patent application Ser. No. 561,856, filed Jul. 30, 1990, entitled "Vehicle Window Regulator Mechanism", assigned to the assignee of the present invention, the disclosure of which is herein incorporated by reference.

Referring to FIG. 2, it will be appreciated that the portions of the guide channel members 24 and 26 which extend above the door beltline will be enclosed within an interior decorative molding shroud (not shown).

The guide channel members 24 and 26 are identical in most respects. Specifically, the main channel members 34 and 78 are virtually identical as are the respective adjoining seal housing sections 80 and 82. Thus, the primary difference resides in the fact that the front guide channel member 24 includes a second section 36 within which the lower guide follower is received, as described below, which is located to the front of the vehicle. At the rear guide channel, the lower guide follower track is disposed laterally outward from main channel section 78 in the direction of the window and is a part of the main channel section as seen best in FIG. 4.

More specifically, the front guide channel 24 seen generally in FIG. 3 comprises a singular generally cylindrically arced channel member 34 extending the full length to be traversed by the window 12 from a fully raised position as shown to a fully lowered position as shown in phantom line. It is of rectangular cross-section similar to the rear guide channel 26 seen in FIGS. 7 and 8. The upper and lower track guide followers 16 and 20 extend laterally inwardly in the direction of the guide channel member 34. Integral with the guide channel member 34 is a second guide channel section 36 extending upwardly to the beltline line and there curving outwardly at 38 towards the beltline. A bottom wall portion 40 of channel section 36 is flared outwardly to accommodate receiving the lower guide follower 20. At the free end of the upper and lower guide followers 16 and 20 there is fixed a slide member 42, 44, respectively. Upper slide member 42 is slidably received within the guide channel member 34, and lower slide member 44 is slidably received within guide channel section 36. Guide channel member 34 and guide channel section 36 each include a vertical slot, similar to the rear guide channel 26 seen in FIGS. 7 and 8, extending from top to bottom on the wall facing the window and outer door panel thereby allowing the guide followers to traverse the vertical extent of each.

For purposes of clarity, the weatherstrip seals affixed to the inner and outer door panels 30 and 46, respectively at the beltline of the door, have been omitted from FIG. 3. Likewise, any illustration in FIG. 3 of the guide channel sealing system extending from the upper track guide member down to the beltline has been omitted. The guide channel sealing system is described in particular detail in connection with FIGS. 5–9 discussed below.

In FIG. 4, there is shown the arcuate rear guide channel member 26 within the cavity 50 formed by the inner and outer door panels 30 and 46, respectively. The window 12 is shown at its fully raised position in solid line and in its fully lowered position in phantom line. Also illustrated is the manner in which it pivots about upper guide follower 18 as the window nears its fully raised position thereby causing the inner surface of the window at its top edge, and side edges to the point that they extend from the top edge to the pivot point, to laterally swing into sealing engagement with the weatherstrip seal 150 at the roof panel and along the front and rear edges of the window to the extent mentioned. The manner in which upper and lower guide followers 18 and 22, respectively, are affixed to the window and operatively coupled with the guide channel member 26 are the same as that earlier described in connection with the front guide channel member of FIG. 3. Again, for purposes of clarity, the weatherstrip seal at the beltline has been excluded as has the vertically extending sealing system shown in detail in FIGS. 5–9.

Figure 5:
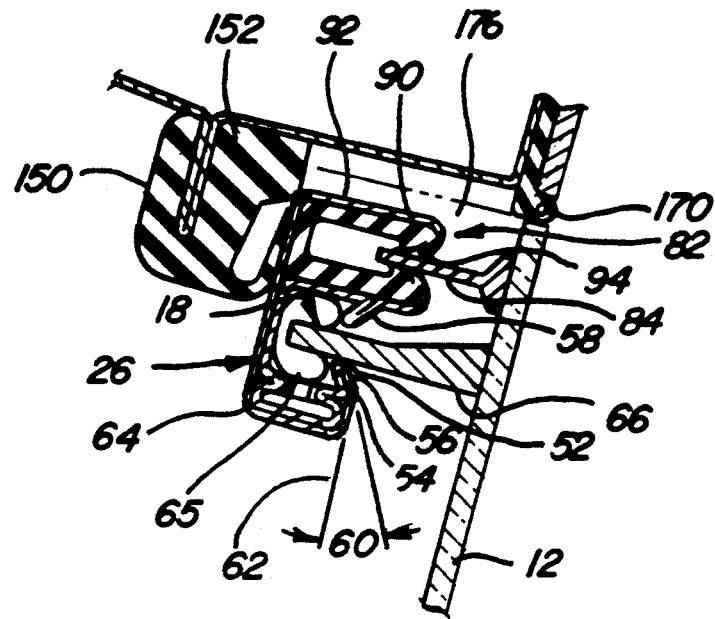
FIG. 5 is a sectional view taken substantially along the lines 5—5 of FIG. 4.
Figure 6:
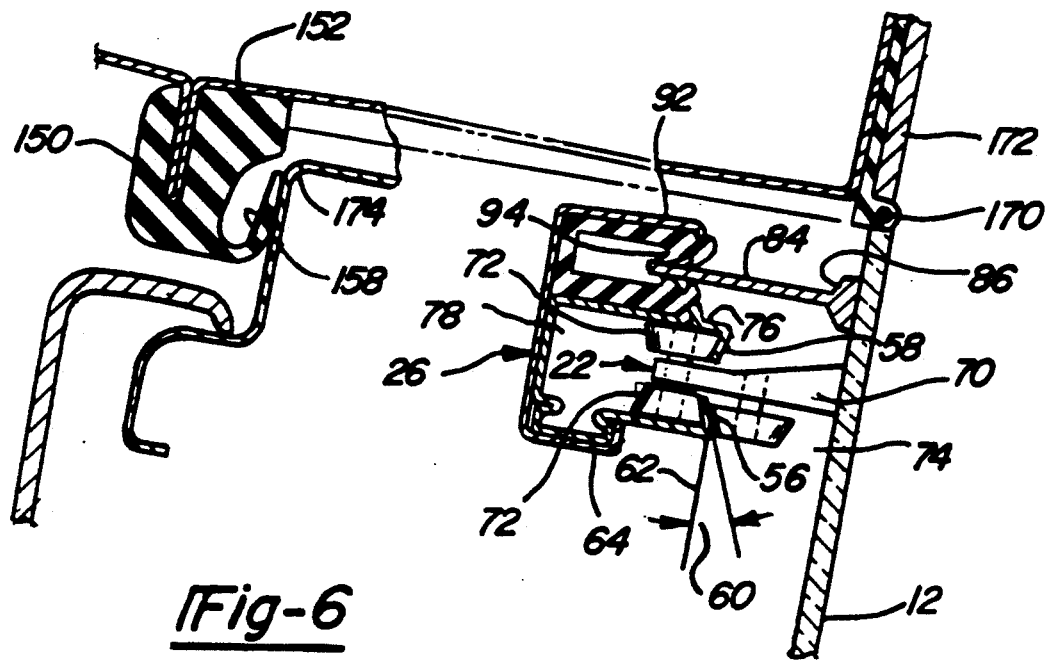
FIG. 6 is a sectional view taken substantially along the lines 6—6 of FIG. 4.
Figure 7:
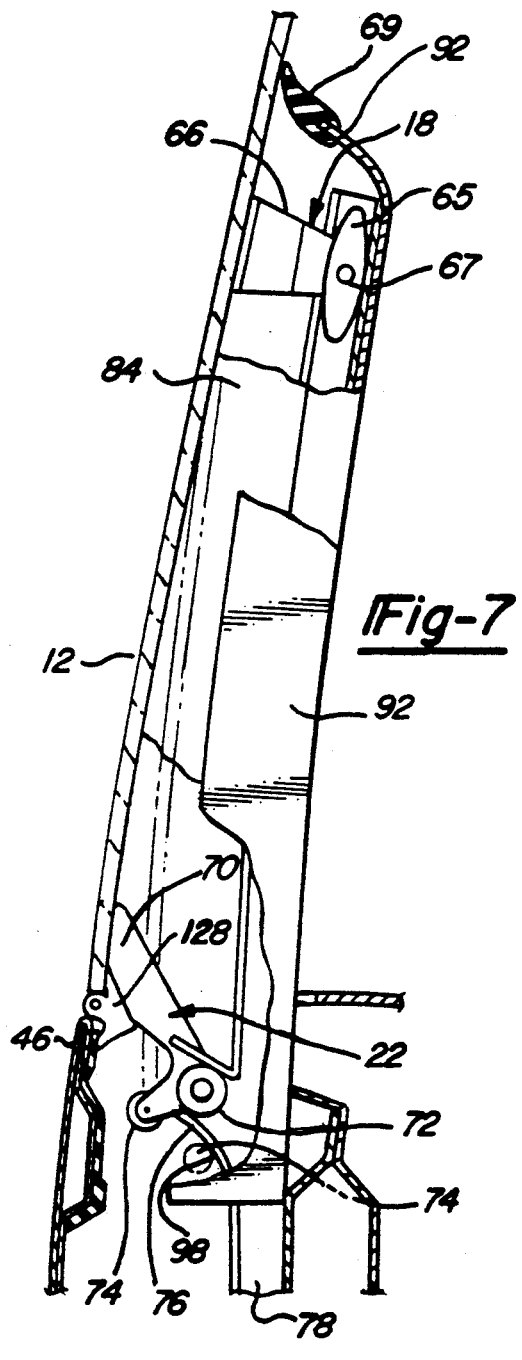
FIG. 7 is a partial cross-sectional end view of the window regulating mechanism as shown in FIG. 4 and particularly illustrating the details of the mid-pivot guide channel assembly at the rear guide channel as viewed from, the rear of the vehicle.

Looking particularly at FIGS. 5–7, the rear channel guide member 26 is generally rectangular in cross-section and includes a slot 52 splitting the end wall 54 facing the window and extending its full length. The end wall 54 is defined by two inwardly directed flanges 56 and 58, each of which extends toward the interior of the guide at an angle 60 relative to the longitudinal axis of the window as designated by the line 62. Angle 60 may range from 15° to 45°, with 30°–35° being preferred. The purpose of forming flanges 56, 58 at such an angle is to decrease the force acting thereon in a direction transverse to the window, caused by the wind pulling on the windows at higher vehicle speeds when it is in a partially raised position. This in turn reduces any tendency of the guide channel member to deflect or become permanently deformed.

The section 64 shown at the inboard edge of the channel guide member is for the purpose of receiving the tape drive mentioned earlier which runs out from the regulating mechanism powered by drive motor 32 for raising and lowering the window.

The upper channel guide follower 18 includes a slide member 65 pivotally affixed to the laterally inwardmost end of guide follower support arm 66 by means of a pin 67. It will be noted from FIG. 7 that the slide member is tapered at its ends. Channel guide follower support arm 66 extends through the slot 52.

At the lower guide follower 22, the laterally inwardmost end of the support arm 70 is provided with a pair of guide rollers 72 rotatably supported thereon.

The lower guide follower support arm 70 is generally L-shaped with the main pair of guide rollers 72 being fixed at the elbow of the L-shaped member. At the base there is rotatably affixed thereto a secondary track roller 74.

At the beltline of the door 14, it will be noted that the channel guide member includes a section 76 which is integral with the main track but abruptly curved at an obtuse angle toward the outer door panel. Section 76 constitutes a secondary guide channel and is open to the main guide channel 78.

Both the slide member 65 and rollers 72 are tapered to match the angle 60 of the guide channel flanges 56, 58.

Figure 8:
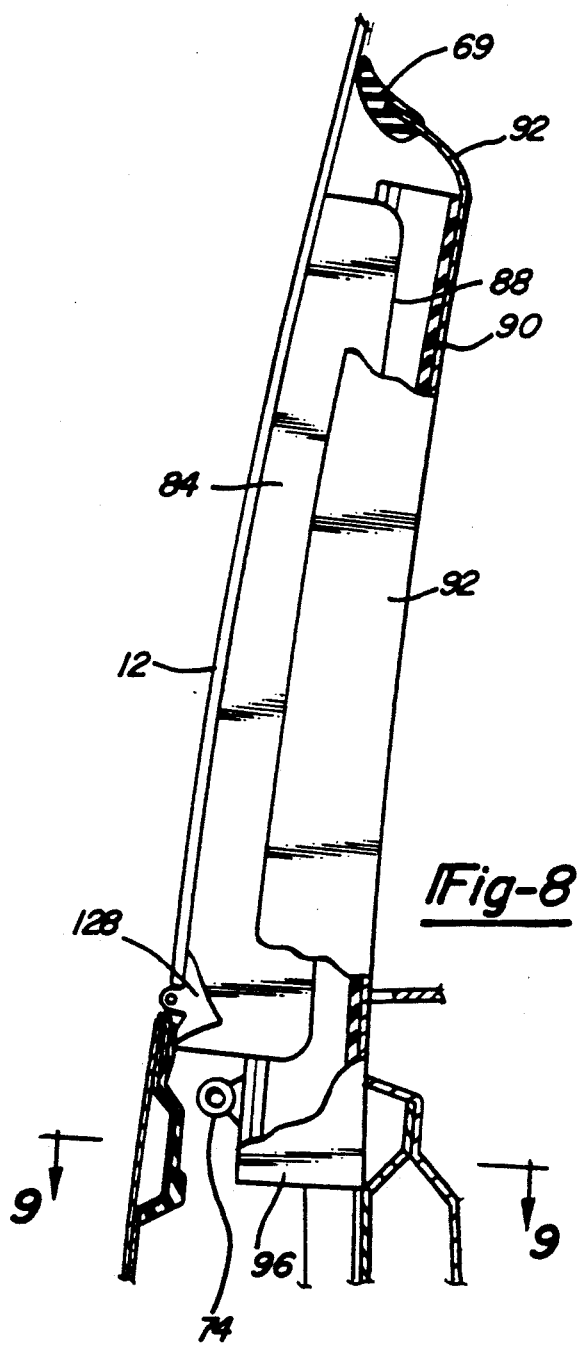
FIG. 8 is a partial cross-sectional end view of the window regulating mechanism as shown in FIG. 4 and particularly illustrating the details of the vane seal member at the rear guide channel as viewed from the rear of the vehicle.

The guide channel sealing systems, designated 80 for the front guide channel and 82 for the rear guide channel are virtually identical. Therefore, only the sealing system 82 for the rear guide channel will be described. It is shown in FIGS. 5-9. The system includes a vertically extending vane member 84 affixed to the window at a base portion 86 and extending in length from a point just above upper guide follower 18 to a lower point just below lower guide follower 22. In cross-section, as shown in FIGS. 5 and 6, the vane member 84 is of uniform cross-sectional thickness and extends laterally inwardly. Its inwardmost edge 88 is tapered relative to the inner surface of the window such that it is of minimum width at its top and maximum width at its bottom, as shown in FIG. 8. The laterally inwardmost portion of vane member 84 is received within a generally U-shaped elongated hollow seal member 90 of synthetic rubber that is enclosed within a sheet metal housing 92 contiguous with the guide channel member 26 and extending the full length of the vane member 84. Sealing ribs 94 extend radially inwardly to impinge upon the outer surfaces of vane member 84 thereby sealing off the inner door cavity 50.

Figure 9:
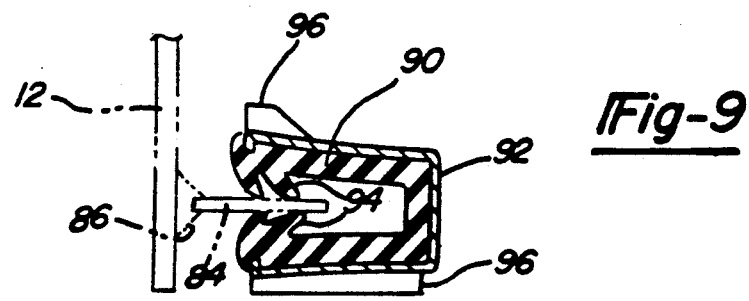
FIG. 9 is a sectional view taken substantially along the lines 9—9 of FIG. 8 and illustrating the manner in which the vane seal member housing is flared to receive the vane seal member.

At its lower end, the rearwardly directed wall of seal housing 92 is flared, as shown at 96 in FIG. 9. This allows that the open end of the U-shaped channel is widest at the portion first receiving the vane member 84 as the window is raised, which assists in accurately locating the vane member in the grasp of the sealing ribs 94.

In operation, looking at FIG. 7, as the window is brought to its fully raised position, the slide member 65 at the upper edge of the window will be brought to a position below the section 76. As it slides past the fork in the guide channel member, its tapered nose portion coupled with its length will cause it to bypass the fork without interruption. As the lower guide track member approaches the fork, the secondary track roller 74 will engage the exterior surface of the channel guide member at the initial point at which the secondary track section departs from the main track section as indicated at point 98 in FIG. 7, and in phantom line. As it does so, it will draw the main pair of track rollers 72 into the secondary guide track and thereby cause the window 12 to pivot dramatically about the axis of slide member 66, namely, pin 67, toward outer door panel 46. At this same time, the window will have engaged seal member 150 and be positioned exactly flush with the vehicle exterior. The engaged portion, i.e. locator portion 154, is very stiff such that the seal acts as a fixed pivot point for the window. If necessary, the door panel will flex slightly to allow the window to become flush at the beltline. This lateral transfer of window 12 will continue as the slide member is carried upwardly by the tape drive until it reaches its final raised position whereby the window will be flush with the exterior surfaces of the vehicle framing the window opening. At this point, it will be noted that the secondary track roller 74 is no longer in engagement with the guide track formed by the exterior wall of the secondary guide member 76.

In lowering the window, secondary track roller 74 will form no part of the operation since the primary pair of track rollers 72 will descend the slope formed by the forked track until it enters and downwardly traverses the main track 78. Again, as the slide member 66 descends and traverses the open section formed at the jointure with secondary guide member 76 will continue uninterrupted due to its length and the tapered nose portion.

Regarding the operation of the seal vane member 84 while the window is pivoting to and from its fully closed position, it will be noted that the vane member also will pivot about the pivot point formed by the slide member pin 67 such that the lower end of the vane member to the greatest extent will reciprocate within the seal housing 92 while at all times the sealing ribs 94 will remain in engagement with the vane member.

Figure 10:
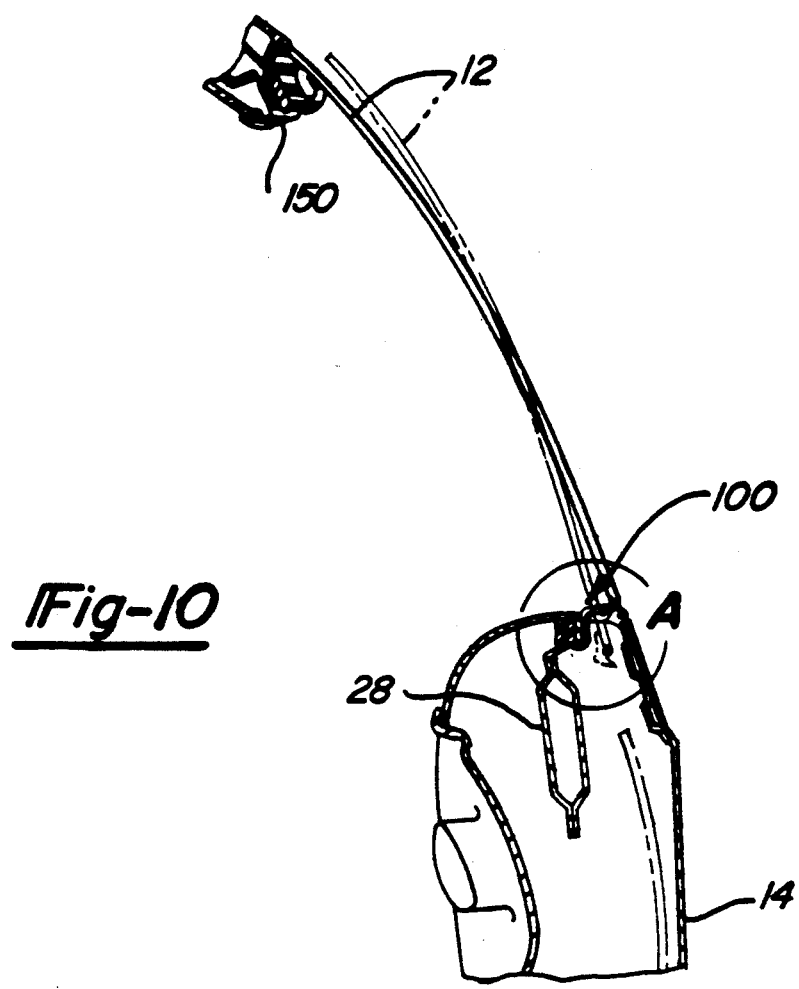
FIG. 10 is a sectional view taken substantially along the lines 10—10 of FIG. 1.
Figure 11:
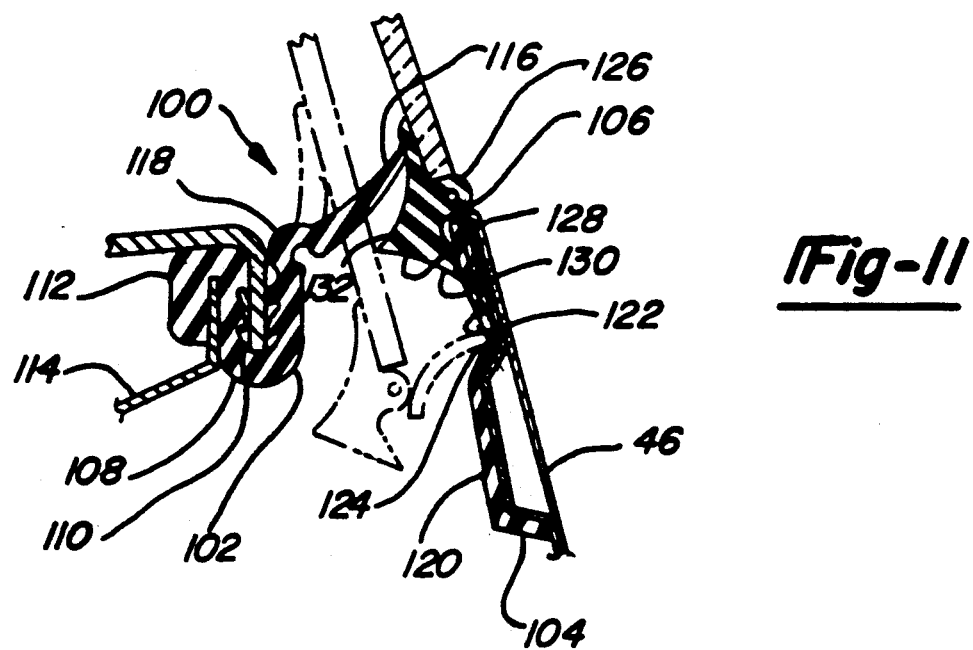
FIG. 11 is an exploded view of the section designated A in FIG. 10 and showing the sealing system for sealing the window panel relative to the door at the beltline in accordance with the present invention.

FIGS. 10 and 11 show in detail the weatherstrip sealing system extending across the longitudinal extent of the door at the beltline from the front edge to the rear edge, omitted from FIGS. 3 and 4 for purposes of clarity. As seen, the sealing system designated generally as 100 comprises three seals of synthetic rubber or the like, namely seal 102 affixed the inner door panel, seal 104 affixed to the outer door panel, and intermediate seal 106 which is affixed to the window and in sealing engagement with seals 102 and 104 when the window is in the fully raised position as shown in solid line.

Inner seal 102 includes a main body portion 108 which is U-shaped in cross-section and includes a plurality of longitudinally extending locking ribs 110 which extend inwardly toward the interior of the body portion. Locking ribs 110 are adapted to sealingly grip a downwardly depending flange, which extends from inner door panel 30. To further lock the seal in place, the interior wall 112 of the body portion 108 is slit longitudinally so as to receive the upwardly extending flange 114 of the internal reinforcing member 28.

At the outward extent of the seal body portion, there adjoins a laterally outwardly extending seal lip 116 connected to the seal body portion by a flex section or live hinge 118. The seal member 102 is an extruded member and the normal unbiased position of the seal lip 116 is that as generally shown in solid line. When the window is to be lowered to a position as shown in phantom line, the seal lip 116 will be forced to a biased state as shown in phantom line and will remain in intimate contact with the window as the window is lowered.

Outer seal 104 also includes a main body portion 120, a seal lip 122 joined to the main body portion at flex section or live hinge 124. The main body portion is affixed to the outer door panel 46 by bonding or any other suitable means. The seal is usually extruded and in its normal unbiased position extends laterally inwardly as shown generally in phantom line. When the window is raised, the seal lip 122 will be forced upwardly into sealing engagement with the intermediate window seal 106 and be pressed against the uppermost portion of the door panel 46 as shown in solid line. When the window is lowered, seal lip 122 will first resume its normal and biased position and thereafter will be forced downwardly in the position exactly as shown in phantom line in FIG. 11.

Intermediate window seal 106 affixed to the window 12 is generally triangular in cross section. At its base, it includes a hollow bulb 126 projecting outwardly therefrom. One side of the bulb 126 and one portion of the base is affixed to the lower edge of the window. The free end portion of the base together with the adjoining side 128 of the seal constitutes a first seal lip 130 which, when the window is in the fully raised position, provides a seal at the outer door panel with seal 104. The remaining side 132 of the triangular cross sectioned intermediate seal defines a sealing surface in sealing engagement with inner door panel seal lip 116. Side 132 of the intermediate seal is cylindrically curved as shown so as to form a line contact across a major portion of the inner seal lip 116. By proper selection of the stiffness of seal lip 130, the seal can provide a stabilizing effect for the window in its fully raised position. Specifically, it is preferred that seal 106 be of dual durometer wherein the bulb 126 will be relatively soft, in the order of Shore A 30 to 80 durometer to provide a live seal between the window and door panel, whereas the remainder of seal 106 will be quite hard in the order of Shore D 40 to 60 durometer, such that the window bottom edge will always be located precisely flush with the outer door panel when the window is fully raised. To this end, the lateral distance between the guide channel 26 and window 12 can be adjusted during assembly to assure that the window is initially precisely flush. Suitable adjusting means are shown in U.S. Pat. No. 4,183,178, incorporated herein by reference, which is assigned to the same assignee as the present invention. It will be noted that the bulb 126 together with the seal formed with outer door panel seal member 104 forms a dual seal for excluding moisture and air. Further, it will be noted that at every position of the window from fully raised to fully lowered, the inner and outer seal lips 116 and 122 close the beltline slot.

Figure 12:
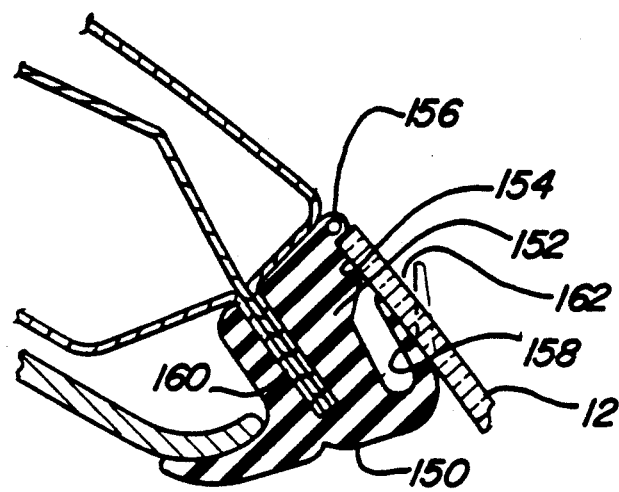
FIG. 12 is an exploded view of the window seal at the roof line shown by the segment designated B in FIG. 4.

FIG. 12 is an exploded view of continuous weatherstrip seal 150 at the upper edge of the window. The seal includes a main body portion 152 having a flat based locator portion 154 and a bulbed seal portion 156 at its upper end and a flexible elongated lip portion 158 at its lower end. The seal body portion includes a slot along one edge for fitting it over a flange 160 extending outwardly from the vehicle body member and thereby securing it. The seal lip member 158, in its uncompressed state, extends radially outwardly from the seal body portion 152 in a manner as shown in phantom line. In the uncompressed state, as the window is lowered, it will be seen that the seal lip in conjunction with the seal body portion forms a channel 162 which functions as a drip rail for catching rain water and precluding it from falling Within the interior of the vehicle.

The seal lip is relatively thin in cross section such that at its juncture with the seal body portion, it defines a flex joint or live hinge. As the window panel is raised, it will first engage the seal lip 158 at its outermost extremity thereafter forcing it to bend about the flex joint and come into contact with the window panel along its full length extending from the flex joint to the tip of the seal lip member. Thereafter, the window engages the locator portion 154 of the seal member simultaneously as the top edge of the window panel engages the bulbed gap-filling seal portion 156 In this fully raised position, it will be noted the window is perfectly flush with the exterior of the vehicle. To assure this result, the locator portion 154 is of substantially greater hardness than seal portion 156 and lip portion 158. For example, the locator portion may be of Shore D 40 to 60 durometer whereas the seal portion 156 and lip portion 158 may be of Shore A 30 to 80 durometer.

Weatherstrip seal 150 is a continuous seal extending from the top of the window panel downwardly along the front and rear edges thereof, to the beltline. As noted in FIGS. 5 and 6, the bulbed gap-filling seal portion 170 may be a separate member, as shown in solid line, fixed to vehicle quarter panel 172. Alternatively, as shown in phantom line it may be an integral part of seal 150, as designated 156 in FIG. 12, extending from the seal body portion 152 by an intermediate portion of varying length which increases from the top edge of the window down to the beltline of the door.

To describe the overall operation of the sealing system for the door, including the window, relative to the door frame, it will be noted from FIG. 6 that the rear end panel 174 of the door engages seal lip 158 of continuous weatherstrip seal member 150, as such is mounted on the vehicle frame member. Likewise, the window is sealed at its rear edge relative to the vehicle by the compression placed upon the bulbed gap-filling seal portion 170.

From FIG. 5, it is seen that the guide channel member 26 and contiguous vertical seal housing 92 are in sealing engagement. From this point upwardly along the front or rear edge of the window, as the case may be, to the upper edge of the window, the seal lip 158 is in sealing engagement with the window This then provides a second sealing system. The first sealing system is that formed by the engagement of the edge of the window with the bulb gap-filling seal portion 170. The second sealing system is that provided by the engagement of the inner surface of the window with the seal lip 158. At the transition as shown in FIG. 5, the second seal is formed with the guide channel member 26 engaging the seal lip 158 and defining a sealed cavity on the interior surface of the window. From this point down to the beltline, there is a need for yet a third sealing system to preclude water and other environmental and contaminant matter from entering the cavity 176. Such a sealing system is provided by the front and rear guide channel sealing systems 80 and 82, respectively, including the vertically extending vane member 84 and associated seal strip 92 earlier described.

Figure 13:
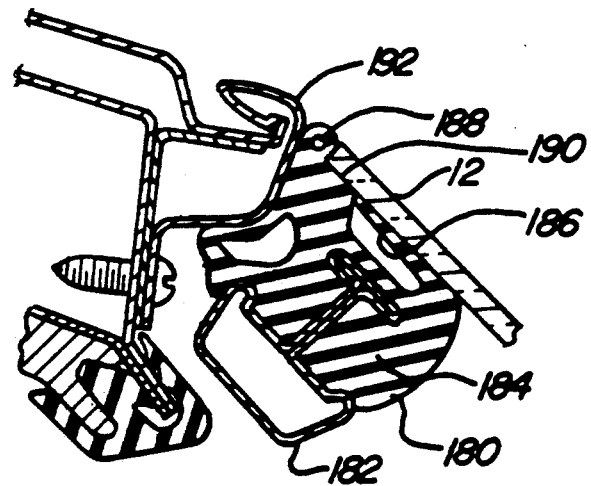
FIG. 13 is a view similar to FIG. 10 but illustrating the construction of a weather strip seal for an alternative vehicle body design, namely a sedan model, in accordance with the present invention.

At FIG. 13, there is shown in cross-section the detail of the weatherstrip seal 180 and associated window frame for a sedan-type vehicle wherein the frame member 182 extends from the beltline of the door upwardly at both front and rear edges of the door and across the upper longitudinal extent to fully define a window opening. The seal body portion 184 as with the previous example shown in FIG. 12, includes a seal lip 186 in engagement with the window 12. Further, it includes a second seal portion in the form of a hollow tube 188 contiguous with a locator portion 190 of the main seal body 184 and which is in compressive engagement with the drip rail 192 of the roof panel.

While the best mode for carrying out the invention has been described in detail, those familiar with the art to which this invention relates will recognize alternative designs and embodiments for practicing the invention. Thus, the above described preferred embodiment is intended to be illustrative of the invention which may be modified within the scope of the following appended claims.

We claim:

1. A vehicle door including an inner door panel and an outer door panel joined together in spaced relation to provide a door cavity therebetween and terminating at an upper edge thereof, said upper edge constituting an elongated beltline opening;

- a window panel adapted to be raised and lowered within said door cavity and through said beltline opening, said window panel having an upper edge portion, lower edge portion, front edge portion, and rear edge portion, said front edge portion spaced apart from and opposite said rear edge portion and said upper edge portion spaced apart and opposite said lower edge portion thereby defining the extremities of the window panel, said window panel further having a midpoint portion located between said upper and lower edge portions;
- guide means within said door cavity for guiding said window panel through said beltline opening as the window panel is raised and lowered.
- said guide means including front and rear guide channel members secured to the vehicle door at said front and rear edge portions of the window panel, respectively;
- lower guide follower means secured to said lower edge portion of said window panel and operatively associated with said guide means for establishing a fixed travel path for said lower edge portion of said window panel as the same passes through said beltline opening;
- upper guide follower means secured to said window panel substantially above said lower edge portion and operatively associated with said guide means, said upper guide follower means including a pivot means;
- said guide channel members circumscribing a generally singular arc whereby the window panel will be raised and lowered along a predetermined travel path;
- at least one said guide channel members comprising a generally U-shaped channel member having a base and two oppositely disposed side flanges, each extending from a respective end of said base and including at a respective end thereof an inwardly directed flange, each said inwardly directed flange terminating at an end, the respective ends of said flanges being spaced from one another so as to define a vertically extending slot extending the vertical length of said guide channel member, said slot being disposed nearest said outer door panel;
- said U-shaped channel member comprising a main guide channel section and a secondary guide channel section, said secondary guide channel section flaring outwardly at an obtuse angle at a throat section substantially opposite said beltline opening and being in open communication with said main channel section at such point, said secondary guide channel section constituting a ramp for laterally transferring the lower edge portion of said window panel about said pivot means, said ramp having an exterior side;
- said upper guide follower means comprising a support member fixed at a midpoint portion of said window panel and extending through said slot within said U-shaped channel member, an upper slide member being pivotally attached to said support member and slidably received within said U-shaped channel member, said upper slide member constituting said pivot means and having a length sufficient to traverse said throat section;
- said lower guide follower means comprising a lower support member extending through said slot within said U-shaped channel member, said support member including a first guide member at the free end thereof and received within said U-shaped channel member, and a second guide member disposed at the free end thereof and exteriorly of said U-shaped channel member whereby, as said window panel is elevated to a fully raised position, said second guide member will engage said exterior side of said ramp thereby causing said first guide member to be drawn into said ramp and translating said lower edge portion of said window panel laterally about said pivot means of said upper guide follower means to a position substantially flush with the outer door panel.

2. The invention of claim 1 wherein said first and second guide members comprise rollers.

3. The invention of claim 1 further including a guide channel sealing system for sealing the edge of said window panel relative to said at least one of said front and rear guide channel members, said sealing system comprising an elastomeric elongated hollow seal member affixed to and extending the length of said guide channel member from said secondary guide channel section to the upper end of said guide channel member, said seal member being slit along its length and providing at the edges of said slit at least one opposing pair of seal ribs, a vane member affixed to said window panel and extending from said lower edge portion of said window panel to said mid-point of said window panel, said vane member being received within said slit and in sealing engagement with said seal ribs beginning at the point at which said upper slide member first approaches the door beltline and continuing during the upward travel of said window panel to its fullest extent including that portion of the window panel travel when the window panel laterally translates about said pivot means.

4. The invention as defined in claim 3 wherein said leading edge of said vane member positioned opposite said slit is tapered outwardly from said window panel from a maximum dimension at the end of said vane member nearest said lower edge portion of said window panel to a least dimension at the opposite end of said vane member to thereby assure that as the window panel is laterally translated outwardly to its fully raised position, the vane member will be maintained in sealing contact with said seal ribs.

5. The invention of claim 4 wherein said guide channel sealing system includes a separate seal housing for said seal member;

- said seal housing being a U-shaped channel member open at the end facing said window panel and contiguous with said guide channel member.

6. The invention of claim 5 wherein said seal housing includes at its lower end an outer wall portion flared outwardly so as to provide a guide for said vane member as it enters said tubular seal.

7. The invention of claim 6 wherein said guide channel sealing system is provided for each of said front and rear guide channel members.

8. The invention of claim 1 wherein said lower edge portion of said window panel includes a beltline sealing system, said beltline sealing system comprising an elongate window seal secured to the window panel only and extending from said front edge portion of said window panel to said rear edge portion of said window panel, said window seal having a base and a pair of sides converging from said base to provide a vertex, said window seal thereby having a V-shaped vertical cross-section and being affixed at its base to the window panel, said vertex being directly laterally inwardly of the window panel, said base and one of said pair of sides of said window seal constituting a first sealing lip, said first sealing lip being substantially incompressible relative to said outer door panel and being adapted to engage said outer door panel when the window panel is swung to the fully closed position, and to maintain said window panel and outer door panel flush relative to one another at the exterior surfaces thereof from said front edge portion of the window panel to said rear edge portion of the window panel.

9. The invention of claim 8 wherein the remaining one of said pair of sides of said window seal constitutes a sealing surface;

said beltline sealing system further including an inner door seal affixed to said inner door panel at the beltline opening and extending the full length of the beltline opening;

said inner door seal including an elongated flexible seal lip coupled to a main body portion by an intermediate portion constituting a live hinge, said seal lip engaging said sealing surface when the window panel is in a fully raised position, and being allowed to rotate about said live hinge as said window panel is raised and lowered.

10. The invention of claim 9 wherein said beltline sealing system further includes an outer door seal affixed to the outer door panel and comprising a main body portion, a flexible seal lip and an intermediate portion constituting a live hinge;

said first sealing lip of said window seal being adapted to engage said seal lip of said outer door seal as said window panel approaches a fully raised position and thereafter causing said seal lip to be firmly pressed against said outer door panel as said window panel is extended to a fully raised position.

* * * * *